Oct. 10, 1967  C. JACUZZI  3,346,014
PRESSURE TANK ASSEMBLY FOR WATER PRESSURE SYSTEM
Filed April 21, 1965  2 Sheets-Sheet 1

INVENTOR.
CANDIDO JACUZZI
BY
WARREN, BROSLER, CYPHER & ANGLIM
HIS ATTORNEYS

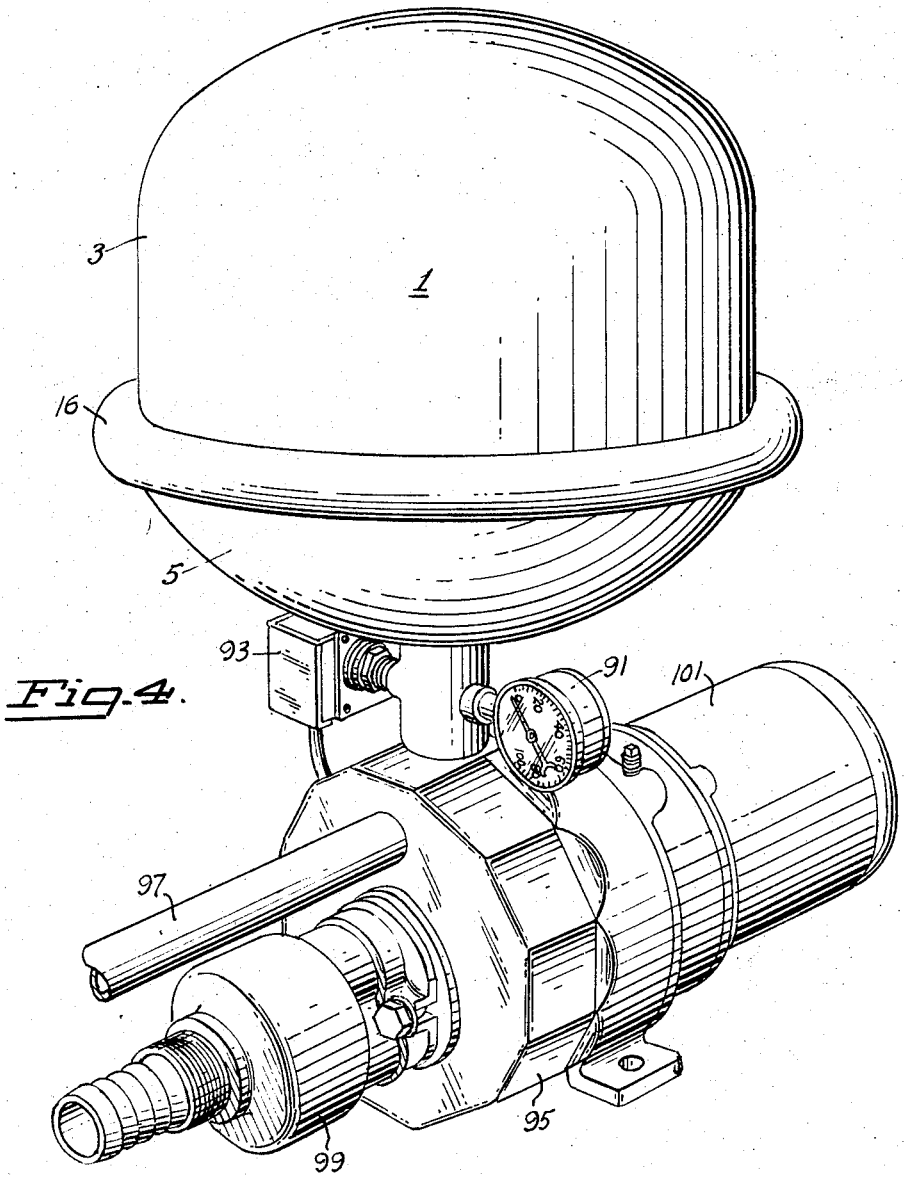

United States Patent Office 3,346,014
Patented Oct. 10, 1967

3,346,014
PRESSURE TANK ASSEMBLY FOR WATER PRESSURE SYSTEM
Candido Jacuzzi, Lafayette, Calif., assignor to Jacuzzi Bros., Incorporated, a corporation of California
Filed Apr. 21, 1965, Ser. No. 449,820
2 Claims. (Cl. 138—30)

ABSTRACT OF THE DISCLOSURE

This invention relates to water pressure tanks for use with pumping systems and comprises a tank having two compartments separated by a resilient diaphragm, one compartment being precharged with air under pressure, the other compartment storing water under pressure and being provided with an intake—discharge assembly providing greater resistance to flow of water into the compartment than to flow from the compartment.

My invention relates to water pressure systems and more particularly to a pressure tank assembly for use in such a system.

The usual water pressure system comprises a motor driven pump arranged to pump water from a supply source such as a well, and to discharge it into an air-containing pressure tank, from which the water passes into the various service lines under pressure. The pump is automatically started and stopped by a pressure switch which is responsive to the prevailing pressure in the tank.

Such pressure systems have well known drawbacks. In the first place, the initial supply of air in the pressure tank gradually becomes absorbed by the water in contact therewith so that the cushioning effect is ultimately lost, and the system is then said to have become water-logged, resulting in erratic operation and frequent cyclic operations of the pump. To inhibit this, air injection means must be provided for replenishing the air in a pressure tank as required.

Among the objects of my invention are:

(1) To provide a novel and improved pressure tank assembly;

(2) To provide a novel and improved pressure tank assembly of relatively small size, yet capable of functioning without excessive cycling operations of the pump;

(3) To provide a novel and improved pressure tank assembly requiring no automatic air charging appurtenances;

(4) To provide a novel and improved pressure tank assembly which will not water-log in use;

(5) To provide a novel and improved pressure tank assembly which can be conditioned at the factory for use in the field, and does not require air charging upon installation.

Additional objects of my invention will be brought out in the following description of a preferred embodiment of the same, taken in conjunction with the accompanying drawings wherein:

FIGURE 4 is a view depicting the pertinent portion of a water system, with an improved water tank assembly installed.

Figure 1:
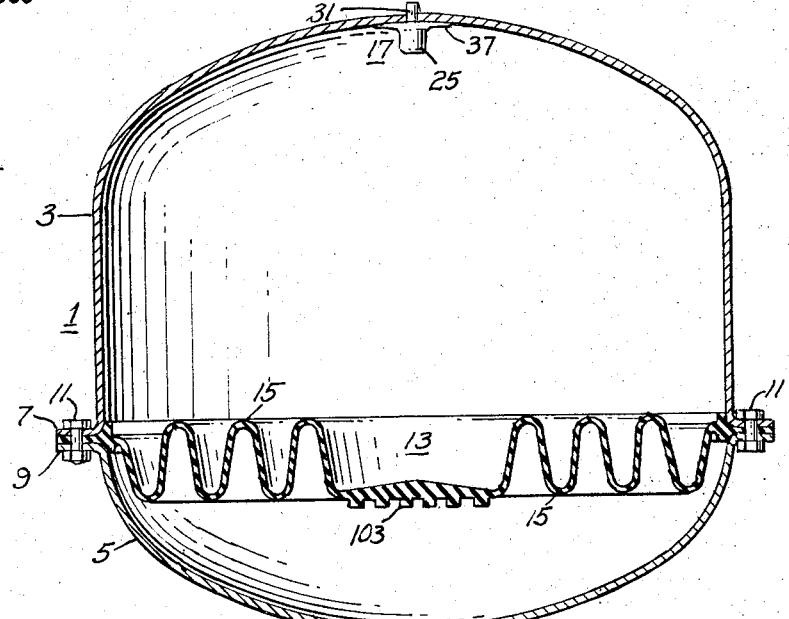
FIGURE 1 is a view in section through a pressure tank assembly embodying the teachings of the present invention.

Referring to the drawings for details of my invention in its preferred form, the same comprises a pressure storage tank 1 including a pair of tank sections 3 and 5 having matching open ends, surrounded by assembly flanges 7 and 9 respectively, such flanges being provided with matching bolt holes, whereby the sections may be united by bolts 11 in fabricating the tank.

Between the flanges is clamped the peripheral rim of a diaphragm 13 of flexible material, the diaphragm, preferably being preformed with concentric circular corrugations 15 enabling the same to expand in either direction from an intermediate position, without stretching of the material itself. The material is impervious to air and water.

The bolted flanges, for purposes of appearance, etc., may be enclosed by a cover 16.

One of the tank sections 3 is preferably of greater longitudinal dimension than the other, and centrally of its remote end wall, there is installed a valve 17 of the self-sealing type, while centrally of the end wall of the other tank section, is a discharge opening in which is installed a pipe nipple passageway 19 to support a pressure responsive valve assembly 21.

The self-sealing type valve 17 may be of any conventional type adapted to receive a needle, through which to supply air to its section of the tank, whereby the tank may be precharged with air at the factory prior to shipping the same to its destination.

One form of such valve is depicted in the drawings as comprising a valve housing 25 of rubber, plastic or equivalent having an axial passageway 27 therethrough, to receive and trap a contoured valve core 29 of somewhat similar material. This core protrudes at one end of the valve housing as an extension 31 having a longitudinal recess 33 to function as a guide for insertion of the needle.

Within the body of the valve housing, the core is formed with a pocket 35, which pocket contains a supply of glycerine.

The valve 17 is installed from within the tank section, with the core extension inserted through a suitable hole provided in the wall of the tank section. To permanently seal such valve installation, the valve housing is provided at the core extension end with a thin tapering flange 37 of considerable flexibility, which will abut against the inner surface of the tank wall to which it may be bonded as with a suitable adhesive.

The pressure responsive valve assembly 21 involves a valve body 41, preferably of metal, threadedly secured to the nipple 19 and terminating in an externally threaded end 43. This end is partially cut away to receive a flapper valve 47 which is hingedly secured within the end of the valve body by a valve pin 49 through the unsevered portion of the body, and, preferably is of material, such as polyethylene, having a specific gravity slightly less than water, to float the valve to its "up" position in the presence of water.

The flapper valve 47 is slotted so that in its closed position, it does not completely block the exposed end of the valve body, whereby in its closed position, it will permit flow of liquid into the tank, but will offer greater resistance to such flow than flow from the tank, and this is a desired characteristic of this valve assembly in the functioning of applicant's invention.

Figure 3:
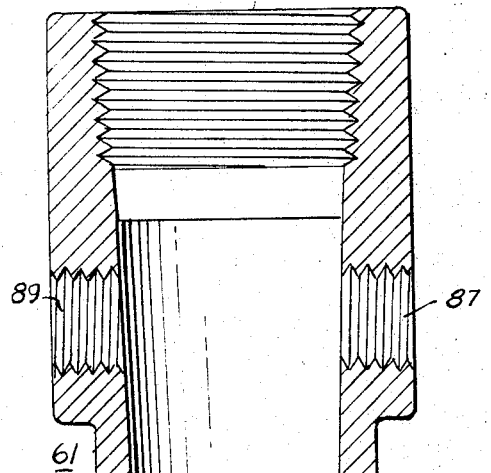
FIGURE 3 is a view in section of an alternate valve assembly, employable in lieu of that depicted in FIGURE 1.
Figure 2:
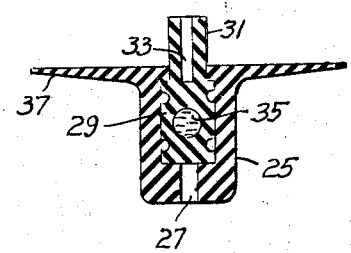
FIGURE 2 is a view in section of a conventional type self-sealing valve utilized in the assembly of FIGURE 1.

An alternately usable pressure responsive valve assembly, and one having certain advantages over that described above, is illustrated in FIGURE 3 of the drawings.

In this valve assembly, a valve body 61 at its lower end, is fitted with a valve cage 63 involving an upper or inner valve cage section 65, having resilient legs 67 straddling the upper end of a lower exposed cage section 69, and terminating in lateral flanges or feet 71, nesting in a trough 73 formed in the lower section.

The valve cage is inserted into the valve body where its position will be determined by the flanges 71 abutting the free end of the valve body.

A plurality of radial inwardly directed ribs 75 in the upper valve cage section, serves to partially restrict the passageway into the tank through this end of the valve cage.

A ball valve 79 within the cage, is adapted to shift from one end to the other of the cage in accordance with prevailing differential pressure, from which it will be observed, that when the ball valve is in its upper or inner position in abutment with the radial ribs 75, which are preferably arced along their engaged edges to receive the ball valve, the resistance to flow into the tank will be greater than resistance to flow from the tank, when the ball is in its lower position. Like the flapper valve 47, the ball valve is preferably of like material to be floated to its up position in the presence of water.

The significance of this difference in flow resistance, will be pointed out in describing the function of the improved pressure tank assembly, when installed as a component part, in a pressure system.

In either of the above described intake-discharge valve assemblies, the valve body is provided with a pair of internally threaded openings 87 and 89, one for the attachment of a pressure gauge 91 and the other for the installation of a pressure switch 93, it being noted that the interior of the valve body is always exposed to the internal prevailing pressure of the pressure tank.

The threaded end of the intake-discharge valve body permits of the installation of the pressure tank assembly on the casing of a pump 95 and in communication with the discharge chamber of such pump, from which a discharge line 97 extends to service. The pump will be provided with any conventional type suction line terminating in a foot valve, and including, where desirable, an injector pump assembly 99. The pump will be driven in any conventional manner, as by the attachment of an electric motor 101 in drive connection to the pump shaft.

When so installed, the lower section of the pressure tank will be in flow communication with the pressure side of the pump by way of the intake-discharge valve assembly 21 or 63 as the case may be, which as previously indicated, is so designed as to offer increased resistance to flow of liquid into the tank over that prevailing during discharge from the tank.

The upper section of the tank is preferably precharged with air at the factory. The pressure of this charge is preferably of the order of 10 to 15% less than the minimum operating pressure for the particular application.

With the precharged pressure tank installed and the pump started, pressure begins to build up in the system and when the pump pressure rises to a value which equals and begins to exceed that to which the tank was precharged, the valve whether it be the flapper valve 47 or the ball valve 79, being at its intake position, slamming of the valve is avoided, and water will flow into the lower section of the pressure tank at a rate determined in part by the increased resistance to flow offered by the intake-discharge valve when in its intake position.

As the lower section of the pressure tank fills up, the diaphragm is caused to expand upwardly in the direction of the air chamber, thus enlarging the water storage compartment and causing the air in the air chamber to be further compressed, until the desired water pressure is realized, at which time, the pressure switch opens, to shut down the pump motor.

Assuming the service line is closed off, and the pump is not operating, pressure equalization occurs throughout the system, but upon opening of the service line to withdraw water from the system, the resulting differential pressure created across the valve assembly, at the pressure tank, it will cause the valve to assume its discharged position, where minimum resistance to flow is offered. This condition will prevail until the pressure is reduced to the starting pressure setting of the pressure switch, at which time, the pump will start, and continue serving the service line, while any resulting reversal in the differential pressure across the valve assembly, will cause the valve to shift to its intake position, and any pump excess will be pumped into the pressure tank under the conditions of the increased flow resistance offered by the valve assembly.

Upon closing off of the service line, and if the tank in the meantime has not reached maximum capacity and pressure has not built up to the shut-off pressure of the pressure switch, the pump will continue pumping into the pressure tank until such condition is reached.

The increased resistance to flow offered by the valve assembly during the filling of the tank, slows up the filling operation, from which it will become apparent, that cycling of the pump will be reduced from what it would otherwise be. This factor has its advantages, in that it permits of the utilization of a relatively small capacity pressure tank, of the order of 12 gallons or so for example, depending on the particular installation, though the invention places no limitation on the size range that could be employed. It is important, however, that the invention does permit of the utilization of such small tank capacities without excessive cycling of the pump.

Should operation of the system result in excessively reduced pressure within the water compartment of the tank, the diaphragm would tend to be drawn into the valve assembly. To prevent this until normal pressures can be reestablished, I provide the diaphragm with a reinforced disc shaped center 103 capable of resisting such a possibility, and without blocking flow.

From the foregoing description of my invention in its preferred form, it will be apparent that the same is subject to alteration and modification, without departing from the underlying principles involved, and I accordingly do not desire to be limited in my protection to the specific details illustrated and described except as may be necessitated by the amended claims.

I claim:

1. A pressure tank assembly for a water pressure system or the like, comprising
   a pressure storage tank, including
   a pair of tank sections having matching open ends bounded by matching flanges,
   a corrugated diaphragm of flexible material adapted in its normal state to span the open end of each said section,
   means joining said tank sections at their matching flanges with said diaphragm clamped therebetween along the rim of said diaphragm,
   a self-sealing type valve in a wall of one of said tank sections to one side of said diaphragm,
   an intake-discharge passageway in a wall of the other of said tank sections to the other side of said diaphragm,
   and a pressure responsive valve assembly at said intake-discharge passageway, adapted to permit flow of a liquid into and out of said tank, but with greater resistance to flow into said tank,
   said pressure responsive valve assembly including
   a hollow valve body secured at one end to said intake-discharge passageway, and terminating in a free externally threaded end,
   a valve in said body of a specific gravity less than that of such liquid and adapted for movement between two positions, said valve, in one of said positions, providing for discharge of liquid from said tank and in its other position providing for intake of liquid into said tank but with greater resistance to flow, said latter position being a normal position during quiescent conditions of said pressure tank assembly.

2. A pressure tank assembly for a water pressure system or the like, comprising
   a pressure storage tank, including a pair of tank sections having matching open ends bounded by matching flanges, a corrugated diaphragm of flexible material adapted in its normal state to span the open end of each said section, means joining said tank sections at their matching flanges with said diaphragm clamped therebetween along the rim of said diaphragm, a self-sealing type valve in a wall of one of said tank sections to one side of said diaphragm, an intake-discharge passageway in a wall of the other of said tank sections to the other side of said diaphragm, and a pressure responsive valve assembly at said intake-discharge passageway, adapted to permit flow of a liquid into and out of said tank, but with greater resistance to flow into said tank, said diaphragm including a relatively rigid section in line with said intake-discharge passageway and contoured to preclude complete blocking of said intake-discharge passageway, if and when said diaphragm expands into engagement therewith, and said pressure responsive valve assembly including a hollow valve body secured at one end to said intake-discharge passageway, and terminating in a free externally threaded end, a valve in said body of a specific gravity less than that of such liquid and adapted for movement between two positions, said valve, in one of said positions, providing for discharge of liquid from said tank and in its other position providing for intake of liquid into said tank but with greater resistance to flow, said latter position being a normal position during quiescent conditions of said pressure tank assembly.

References Cited

UNITED STATES PATENTS

| | | | |
|---|---|---|---|
| 1,549,260 | 8/1925 | Johnson | 137—207 |
| 2,345,124 | 3/1944 | Huber | 138—30 |
| 2,345,475 | 3/1944 | Herman | 138—30 |
| 2,543,585 | 2/1951 | Miller | 138—30 |
| 2,880,759 | 4/1959 | Wisman | 138—30 |
| 2,896,862 | 7/1959 | Bede | 138—207 |
| 3,019,818 | 2/1962 | Everett | 138—30 |

M. CARY NELSON, *Primary Examiner.*

W. R. CLINE, *Assistant Examiner.*